(12) United States Patent
York

(10) Patent No.: US 9,036,629 B2
(45) Date of Patent: May 19, 2015

(54) SWITCH MODULE

(75) Inventor: Justin E York, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 13/458,053

(22) Filed: Apr. 27, 2012

(65) Prior Publication Data

US 2013/0287020 A1    Oct. 31, 2013

(51) Int. Cl.
H04L 12/50 (2006.01)
H04L 12/709 (2013.01)
H04L 12/933 (2013.01)

(52) U.S. Cl.
CPC .............. H04L 45/245 (2013.01); H04L 49/15 (2013.01); Y02B 60/33 (2013.01)

(58) Field of Classification Search
CPC ... H04L 45/245; H04L 12/185; H04L 12/184; H04L 45/00; H04L 45/66; H04W 80/04; H04W 40/36; H04W 48/18; H04W 76/04; H04W 80/10; H04W 8/22
USPC .......................... 370/389, 401, 331, 351, 386
See application file for complete search history.

(56) References Cited

U.S. PATENT DOCUMENTS

| | | | |
|---|---|---|---|
| 5,617,421 A | 4/1997 | Chin et al. | |
| 5,905,723 A | 5/1999 | Varghese et al. | |
| 6,148,204 A * | 11/2000 | Urs et al. | 455/433 |
| 6,496,502 B1 | 12/2002 | Fite, Jr. et al. | |
| 6,535,489 B1 | 3/2003 | Merchant et al. | |
| 6,535,510 B2 | 3/2003 | Kalkunte et al. | |
| 6,553,029 B1 | 4/2003 | Alexander | |
| 6,567,417 B2 | 5/2003 | Kalkunte et al. | |
| 6,614,758 B2 | 9/2003 | Wong et al. | |
| 6,646,983 B1 | 11/2003 | Roy et al. | |
| 6,665,495 B1 | 12/2003 | Miles et al. | |
| 6,950,430 B2 | 9/2005 | Kalkunte et al. | |
| 6,973,082 B2 | 12/2005 | Devi et al. | |
| 7,072,335 B1 | 7/2006 | Kadambi et al. | |
| 7,203,192 B2 | 4/2007 | Desai et al. | |
| 7,274,694 B1 | 9/2007 | Cheng et al. | |
| 7,313,135 B2 | 12/2007 | Wyatt | |
| 7,315,552 B2 | 1/2008 | Kalkunte et al. | |
| 7,327,748 B2 | 2/2008 | Montalvo et al. | |
| 7,404,012 B2 | 7/2008 | Matters et al. | |
| 7,443,851 B2 * | 10/2008 | Fukushima et al. | 370/390 |
| 7,492,765 B2 | 2/2009 | Edsall et al. | |
| 7,551,616 B2 | 6/2009 | Devi et al. | |
| 7,593,400 B2 | 9/2009 | Zelig et al. | |
| 7,606,227 B2 * | 10/2009 | Fukushima et al. | 370/390 |
| 7,606,230 B1 | 10/2009 | Cohen et al. | |
| 7,693,169 B2 | 4/2010 | Shimada | |

(Continued)

OTHER PUBLICATIONS

EMC Isilon Storage and VMware vSphere 5, (Research Paper), Jan. 2012.

Primary Examiner — Dang Ton
Assistant Examiner — Sai Aung
(74) Attorney, Agent, or Firm — Hewlett-Packard Patent Department

(57) ABSTRACT

Examples included in this disclosure provide, among other things, the receipt of data intended for a destination at a switch of a switch module. In response to the receipt of data, the switch module may determine whether a local port on the switch is a member of a link aggregation group that includes the egress port on second switch. In response to such a determination, the switch module may update the forwarding table of the switch to indicate the local port is an egress port for the destination.

18 Claims, 6 Drawing Sheets

(56) References Cited

U.S. PATENT DOCUMENTS

| | | |
|---|---|---|
| 7,860,116 B2 | 12/2010 | Tadimeti et al. |
| 7,912,091 B1 | 3/2011 | Krishnan et al. |
| 7,944,913 B2 | 5/2011 | Ogasahara |
| 7,969,880 B2 | 6/2011 | Yano et al. |
| 8,059,638 B2 * | 11/2011 | Nam et al. ............. 370/386 |
| 8,068,503 B2 | 11/2011 | Desai et al. |
| 8,085,778 B1 | 12/2011 | Cohen et al. |
| 8,122,127 B2 | 2/2012 | Bhatt et al. |
| 8,125,928 B2 * | 2/2012 | Mehta et al. ............. 370/254 |
| 8,139,492 B1 | 3/2012 | Peterson et al. |
| 8,165,117 B2 | 4/2012 | Wyatt |
| 8,243,729 B2 | 8/2012 | Subramanian et al. |
| 8,332,525 B2 * | 12/2012 | Lynch et al. ............. 709/229 |
| 8,423,639 B2 | 4/2013 | Pope et al. |
| 8,521,170 B2 * | 8/2013 | Buckley et al. ............. 455/445 |
| 2010/0316055 A1 | 12/2010 | Belanger et al. |
| 2011/0122854 A1 * | 5/2011 | De Lind Van Wijngaarden ............. 370/338 |
| 2012/0033665 A1 * | 2/2012 | Da Silva et al. ............. 370/389 |
| 2012/0033669 A1 | 2/2012 | Mohandas et al. |

* cited by examiner

SWITCH MODULE

BACKGROUND

Network servers may communicate with one another to process data. The data transferred between the network servers may be routed via various media and other computing devices, for example, switch modules. Latency or delay in routing the data may be introduced as the number of these devices increases.

DETAILED DESCRIPTION

Figure 1:
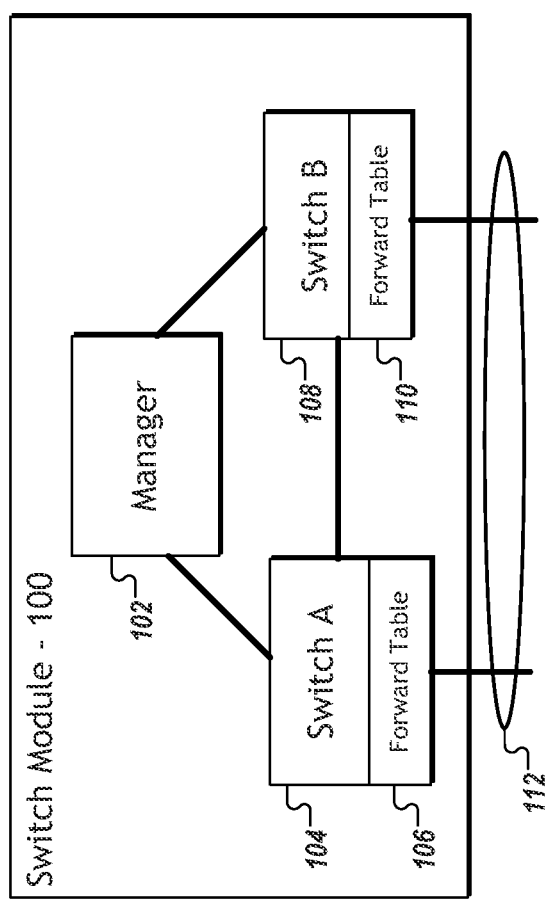
FIG. 1 illustrates an example of a switch module in accordance with an example of the present disclosure.

Generally, multiple servers may work cooperatively to process data, requests, and various other transactions. Hyperscale workloads involve a series of servers working together to respond to a vast number of user requests. Each server in the series performs specialized actions and often makes queries to other servers on the network to complete the final response. Hyperscale servers are generally defined as server systems which utilize vast numbers of servers, for example, from tens of servers to thousands of servers, to process the vast number of requests.

As the number of servers increases, additional devices are utilized to enable communication amongst the servers. These additional devices may introduce latency and reduce throughput of data. When scaled to hyperscale-sized workloads, even small amounts of latency introduced by the additional devices can have a large cumulative cost.

To combat network latency in server systems, various practices may be employed. One example of such a practice is "link aggregation." Link aggregation is the combination of multiple physical ports to form a group of ports that can be treated as one single higher bandwidth port. Link aggregation in hyperscale network systems, however, may lead to increased latency due to the internal "stacked" architecture of the switch module.

The latency introduced in response to implementing link aggregation protocols within a stacked architecture may result from the establishment of non-optimal flow paths. The probability of establishing these non-optimal flow paths increases as the number of switches increases. As used herein, a switch is a device utilized to route data, for example data packets, to various destinations. Once established, these non-optimal flow paths introduce unnecessary latency, which is not readily visible to a user the system.

As used herein, "stacking" is the ability to manage a group of network devices, such as switches, as a single unit. A "stacked architecture" gives multiple physical switches the appearance of one large physical switch. The stacked switches may be coupled using various technologies including a connection between network ports, a connection between dedicated stacking ports, or a connection utilizing a specialized stacking bus. Stacking is advantageous in creating a switch with a large number of ports which can be managed utilizing a single interface. As an example, a design for a 48 port switch may actually comprise four-14 port switches attached to one another in a mesh by way of a fabric chip. Other examples are contemplated.

In the present disclosure, a mechanism is provided for reliably eliminating network latency introduced by implementing link aggregation in a stacked architecture. Reducing network latency improves performance of the overall system. This may lead to increases in throughput, and consequently, lower cost of transactions because fewer systems can service a larger workload. In various examples, the mechanism may facilitate determinations of whether local ports, which are members of a link aggregation group, may be utilized for forwarding data rather than a learned port. In such instances, "hops" or "steps" between various switches may be negated and optimal flows between sources and destinations may be established. A flow, as used herein, may be defined as a conversation or exchange of data between two nodes.

Referring to FIG. 1, an example of a switch module is illustrated in accordance with an example of the present disclosure. The switch module 100 comprises a manager 102, a first switch 104, and a second switch 108. Switch A 104 may include a forwarding table 106, and switch B 108 may include a forwarding table 110. The switch module 100 may include other components without departing from the teachings of the present disclosure, for example, the switch module 100 may include additional switches thereby incorporating additional ports into the switch module.

As illustrated, manager 102 is coupled to both switch A 104 and switch B 108. Additionally, switch A 104 is illustrated as being coupled to switch B 108. The coupling between switch A 104 and switch B 108 may implement a stacking architecture, whereby switch A 104 and switch B 108, while distinct devices may be viewed as a single switch by other devices. Additionally, switch A 104 and switch B 108 are each illustrated as each having a port that is included in a link aggregation group, indicated by ellipse 112. The switches may also include additional ports (not illustrated) that are not part of the link aggregation group 112, and additional ports (not illustrated) that are part of the link aggregation group 112.

In various examples, manager 100 may be a switch manager that is to manage both switch A 104 and switch B 108. In one example, the manager 100 may be a management processor configured to execute programming instructions stored on a computer readable medium. In other examples, the manager 100 may be a controller including logic, programming, and/or other components to facilitate control of one or more switches. In yet other examples, such as "openflow" protocol, the manager may be disposed within other devices which are communicatively coupled to the switch module 100.

Switch A 104 and switch 108 may be any type of switch utilized in the art. For example, switch A 104 and switch B 108 may be application specific integrated circuits (ASICs). Switch ASICS may be include a predetermined number of ports which may then be coupled together to form a stacked architecture as mentioned previously. Other types of switches, for example, box switches are also contemplated.

In controlling or managing switch A 104 and switch B 108, the manager 100 is to provide a forwarding table 106 to switch A 104 and a forwarding table 110 to switch B 108. Forwarding tables 106, 110 are any table or data utilized by the switches 104, 108 to establish a flow or exchange data. For example, a forwarding table may include a list of destinations, an egress switch, and an egress port on that switch, among other data. Forwarding tables 106, 110 enable switches to make routing decisions for data in which a destination is known. For example, in providing the forwarding tables 106, 110 to the switches 104, 108 respectively, the manager 102 may identify a port of switch A 104 as an egress port for a destination in the forwarding table 106, while identifying a port of switch B 108 as an egress port for a destination in the forwarding table 110. The disparate egress ports within the forwarding tables 106 and 110 may reduce latency, as will be discussed in more detail herein.

Figure 2:
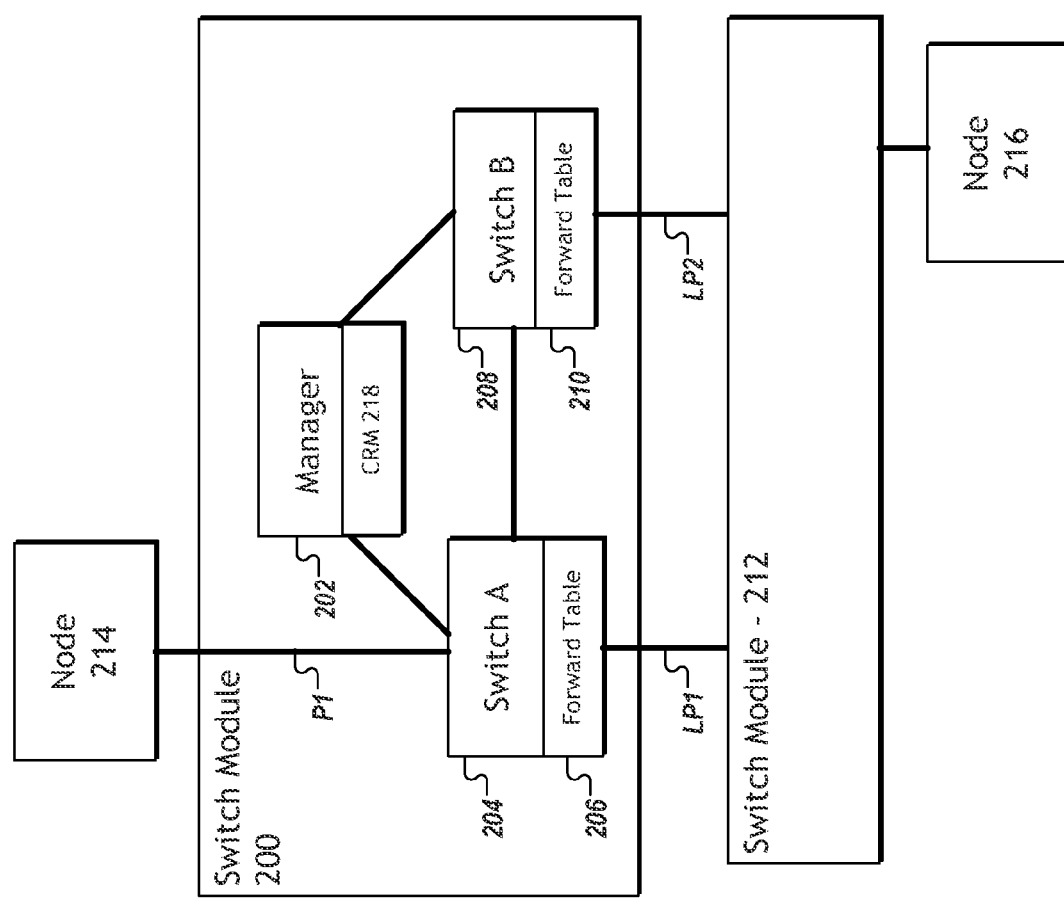
FIG. 2 illustrates an example of a switch module incorporated into a system in accordance with an example of the present disclosure.

Referring to FIG. 2 a switch module 200 is illustrated within a system, in accordance with an example of the present disclosure. The switch module 200 includes a manager 202 having a non-transitory computer readable medium 218, a switch A 204, and a switch B 208. The switch module 200 is coupled to node 214 via port P1 of switch A 204, and switch module 212 via port LP1 of switch A 204 and port LP2 of switch B 208. In turn, switch module 212 is coupled to node 216. Switch module 212, while not illustrated as incorporating any components, may include components generally similar to that of switch module 200. It is noted that the system is merely exemplary, and that more or fewer devices may be utilized and coupled in different manners.

In the illustrated example, port LP1 associated with switch A 204 and port LP2 associated with switch B 208 may be associated with a link aggregation group. In various examples, switch A 204 and/or switch B 208 may include additional ports which are not associated with the link aggregation group. The link aggregation group enables several connections between switch modules 200 and 212, and may increase the throughput of the overall system. For example if a single link is capable of transferring data at a line rate of 1 gigabit per second, the combination of LP1 and LP2 may enable the transfer of data at a line rate of 2 gigabits per second.

In various examples, the manager 202 may provide a forwarding table 206 to switch A 204 and a forwarding table 210 to switch B 208. The forwarding table 206 and 210 may indicate an egress port of the switch B 208 for a destination. For example, assume node 216 transmits data intended for (e.g. with a destination address) of node 214. Switch module 212 may ingress (e.g. receive) the data and determine whether or not a forwarding table entry is available for node 214, i.e., whether switch module 212 has knowledge of where to forward the data. Assuming that switch module 212 does not include a forwarding table entry for node 214, the switch module 212 may flood the data to all ports. Flooding, as used herein, describes the transmission of data on ports within a broadcast domain of a switch or switch module.

In flooding data on all ports of the broadcast domain, switch module 212 makes a decision on which port (either LP1 or LP2, but not both) to send the data. Only one port is utilized because ports LP1, LP2 are associated with a link aggregation group. Assuming switch module 212 arbitrarily egresses the data on port LP2, switch B 208, in response, will ingress receive) the data on LP2. Upon receiving data, switch B 208 may indicate to manager 202 that an address for node 216 has been obtained and that forwarding tables 206, 210 should be updated. In other words, the address and port for node 216 is obtained as a consequence of switch 208 receiving data from node 216.

Switch B 208, additionally having no knowledge of the destination node 214, may then flood the data out of all ports within the broadcast domain on switch B 208, excluding the port on which the data was received (i.e., LP2). Switch B 208 may instruct switch A 204 to also flood the data out all ports within the same broadcast domain, excluding any port that is within a link aggregation group of a port (i.e., LP1) the data was received on (i.e., LP2 of switch B 208). With switch B 208 flooding the data on all broadcast domain ports, node 214 may receive the data via port P1. Upon node 214 responding to node 216, switch A 204 may ingress data from node 214 via port P1. Switch A 204 may then instruct manager 202 that node 214 may be reached via port P1 on switch A 204. Manager 202 may then provide the updated forwarding tables 206, 210 to both switch A 204 and switch B 208. The provided forwarding table indicating that data destined for node 214 may be egressed on port P1 of switch A 204.

To reduce latency, the manager 202 may be further configured to determine whether a port LP1 of the first switch A 204 is in a link aggregation group that includes the egress port LP2 of the second switch B 208. In other words, because node 216 is reachable via port LP2 on switch B 208, the manager 202 may determine that all active ports that are members of the link aggregation group (i.e., LP1) can also reach node 216. Consequently, if a port of switch A 204 is a member of the link aggregation group, the port LP1 may also act as an egress port for a destination indicating node 216. In response to such a determination, the manager 202 may update the forwarding table 206 of switch 204A to indicate the port LP1 is an egress port for the destination. This reduces latency by negating the need for switch A 204 to forward the data to switch B 208 as originally provided by the manager 202.

In various examples, upon updating the forwarding table 206 in switch A 204, the manager 202 may maintain different forwarding tables within each switch. For example, the manager may maintain a first forwarding table 206 in switch A 204 and a second forwarding table 210 within switch B 208 that include different forwarding table entries. Additionally, while the manager 202 is described as providing a forwarding table to each of switch A 204 and switch B 208, and subsequently updating the forwarding tables 206, 208. It is noted that the manager 202 may simply provide the updated forwarding tables 206, 208.

Figure 3:
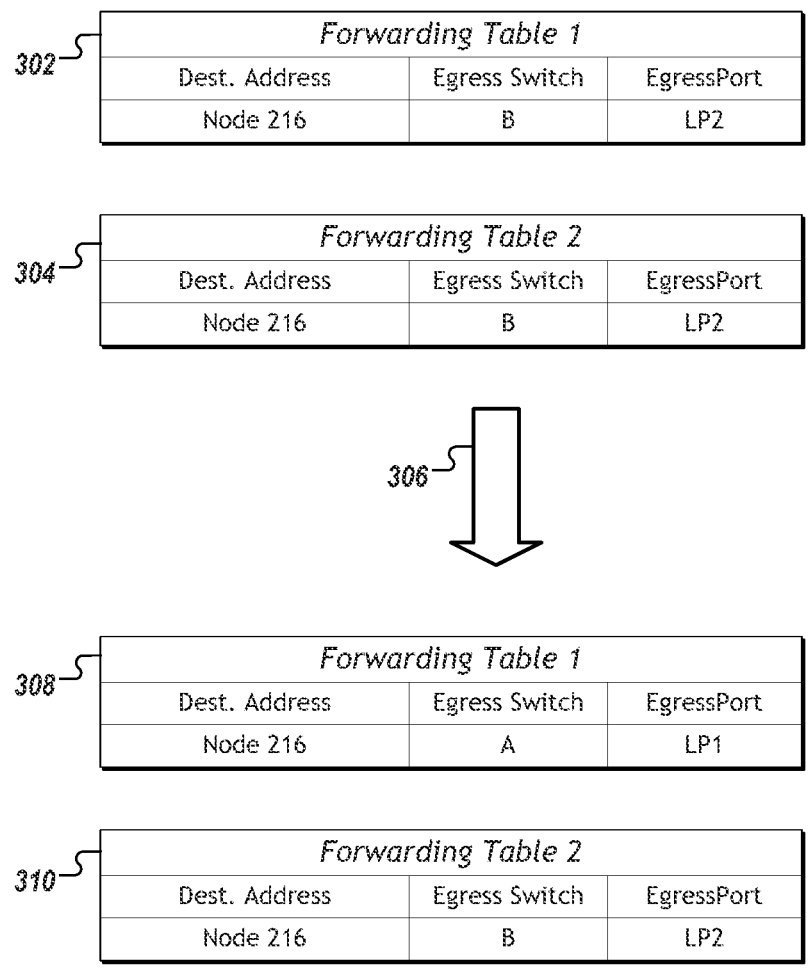
FIG. 3 illustrates examples of forwarding tables in accordance with the present disclosure.

Referring to FIG. 3, forwarding tables corresponding to switch A 204 and switch B 208, as discussed with reference to FIG. 2, are illustrated in accordance with an example. Forwarding tables 302 and 304 may be provided by a manager 202 to switches A 204 and B 208 upon receipt of data from node 216 on port LP2 of switch B 208. Upon an event 306, the manager may determine whether a port of another switch is associated with a link aggregation group that includes port LP2, and update the forwarding table of that switch to indicate the local-to-that switch port is instead an egress port for the destination node 216. As illustrated, forwarding table 308 indicates that node 216 may be reached by forwarding, data over port of switch A 204. While updating forwarding table 308, the manager may maintain forwarding table 310.

The event 306, in various examples, may occur in response to receipt of data at the first switch, when the first switch does not include a forwarding entry for the destination. In other words, upon updating a forwarding table, a manager may additionally determine optimal flows. In other examples, the event 306 may occur in response to a learning event or based on a timing event. A timing event may be a periodic event in which upon the manager 202 determines whether various ports are associated with link aggregation groups and updates those forwarding tables.

Figure 4:
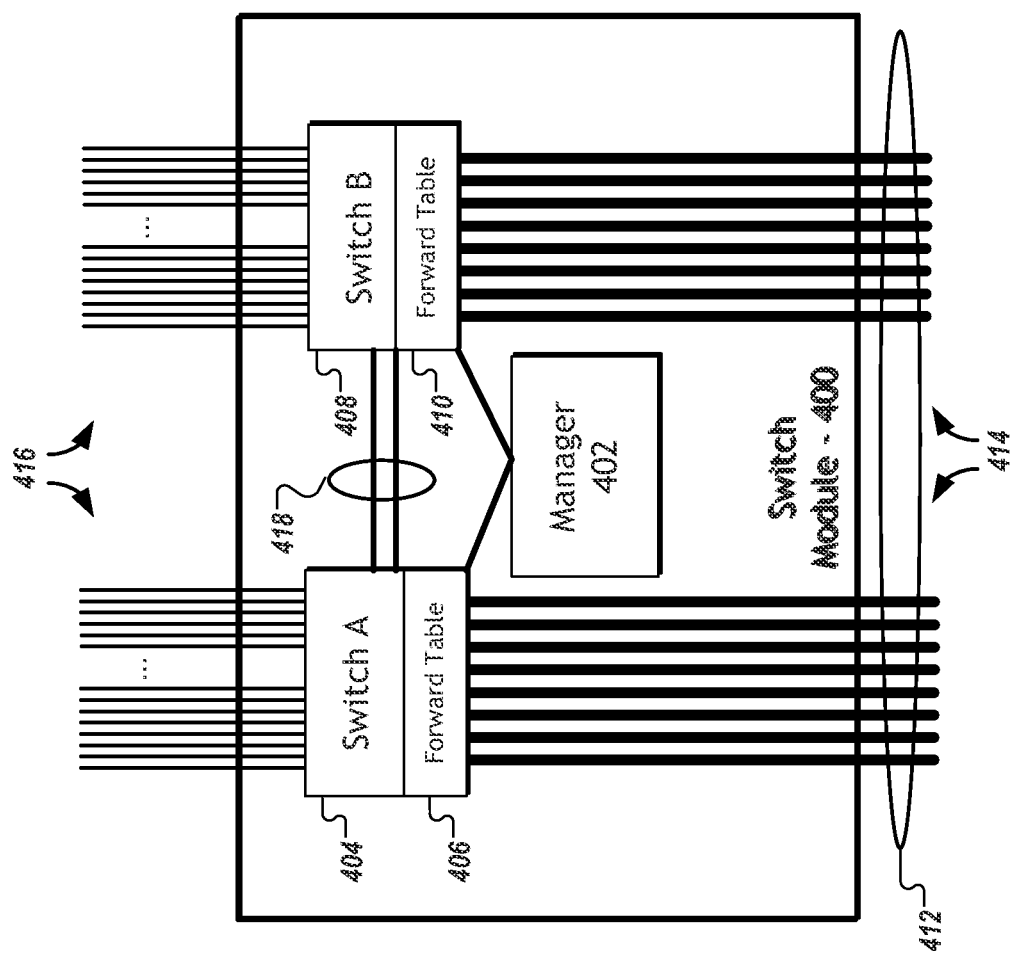
FIG. 4 illustrates another example of a switch module in accordance with an example of the present disclosure.

Referring to FIG. 4, another example of a switch module 400 is illustrated in accordance with an example of the present disclosure. The switch module 400 includes manager 402, switch A 404, and switch B 408, the switches having respective forwarding tables 406, 410. In the illustrated example, switch 400 is a 196 port switch, which may be utilized in conjunction with a hyperscale server architecture.

Switch A 404 and switch B 408 include ports 416, for example Ethernet ports, for coupling and transmitting data to, from, and between various servers. Any number of ports may be utilized, in one example, there may be 90 one gigabit (Gb) ports per switch 404, 408. In the example, the ports 416 provide 180 total one gigabit (1 Gb) Ethernet server connections.

In addition, each switch 404, 408 is coupled to the other via one or more stacking links 418. In the illustrated example, two stacking links are included. The two stacking links may each be 42 Gb links, which provide 84 Gb of stacking capacity between the two switches 404, 408. The switches 404, 408 also include a plurality of ports 414, for example Ethernet ports, that are combined to form 4 forty gigabit (40 Gb) Ethernet uplink connections. These ports 414 may couple to other switches within a datacenter and/or provide access to an external network. The ports 414 may also be combined and/or associated with a link aggregation group 412. Which ports are associated with the link aggregation group 412 may be stored and updated with manager 402.

The manager 402, similar to the manager 102 discussed with reference to FIG. 1, may provide forwarding tables including different forwarding table entries to each of switch A 404 and switch B 406. For example, the manager 402 may provide a first forwarding table 406 to switch A 404 which indicates one of the ports 414 local to switch A 404 is an egress port for a destination. In addition, the manager 402 may provide a second forwarding table 410 to switch B 408, which indicates one of the ports 414 local to switch B 408 is instead an egress port for the same destination. The different forwarding tables 406, 410 prevent the unnecessary transmission of data over stacking links 418, thereby reducing latency.

Figure 5:
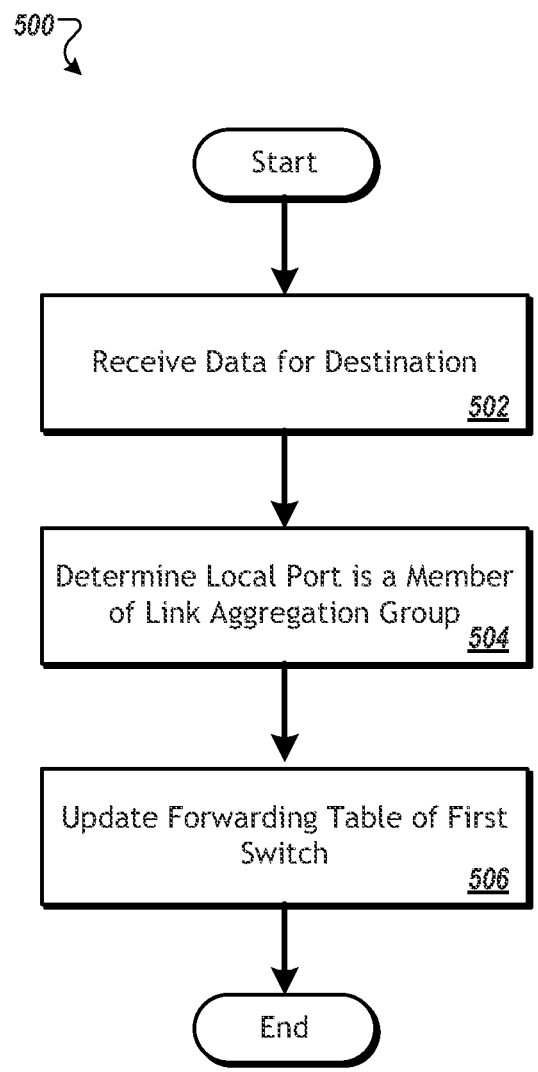
FIGS. 5 and 6 illustrate flow diagrams in accordance with various examples of the present disclosure.
Figure 6:
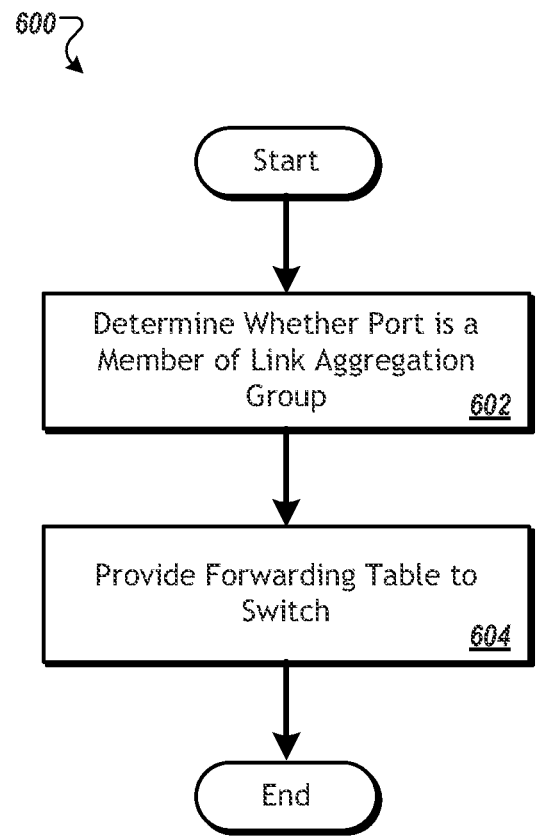

Referring to FIG. 5 and FIG. 6, flow diagrams are illustrated in accordance with various examples of the present disclosure. The flow diagrams should not be construed in a limiting manner as it is expressly intended that additional elements may be included without deviating from the instant disclosure. Additionally, it is noted that while the processes are illustrated in a particular order, the order is not meant to limit the disclosure. Rather, various processes may occur in orders other than illustrated or simultaneously with other elements. The flow diagrams may represent processes that may be embodied on a non-transitory computer readable medium, which may be executed by a processor to cause a device, for example a switch manager, to perform various operations.

With reference to FIG. 5, the flow diagram 500 may begin and progress to block 502, where a switch of a switch module may receive data intended for a destination. In various examples, the switch may include a forwarding table entry that indicates an egress port on a second switch. The forwarding table entry may have been generated in response to a learning event.

Rather than forwarding the data to the second switch in accordance with forwarding table entry, the switch module may determine, at block 504, that a local port of the first switch is a member of a link aggregation group that includes the egress port of the first switch. This determination may be based upon previous information received by the manager. For example, a manager of the switch module may receive input assigning various ports (i.e., the egress port of the second switch and the local port of the first switch to the link aggregation group. The switch module may then utilize this input in making determinations to update forwarding tables.

At block 506, the switch module may update the forwarding table of the first switch to indicate the local port is an egress port for the destination. In updating the forwarding table of the first switch, the switch module may maintain the previous forwarding table of the second switch. In other words, the switch module may provide, update, and maintain distinct forwarding table entries within the forwarding tables of different switches.

Once the forwarding tables of the first switch has been updated to indicate the local port is an egress port, the first switch may forward the data to the destination via the local port. This forwarding via the local port may reduce latency by negating the need to forward the data to the second switch as indicated by the previous forwarding table. Once updated, any additional data received at the first switch or the second switch will be forwarded to the destination utilizing a local egress port.

Referring to FIG. 6, another flow diagram 600 is illustrated. The flow diagram 600 may begin and progress to block 602 where a switch module, via a processor, may determine whether a port of a first switch is in a link aggregation group that includes a port of the second switch. In one example, data is received on the port of the second switch. Receiving data on a port of the second switch may initiate a learning event in which a forwarding table is generated noting that the port of the second switch is the egress port for a destination. Rather than propagating the forwarding table to multiple switches, a manager, may attempt to better assess the inherent architecture of the system.

Based on the determination, the switch module may provide a forwarding table, at block 604, to the first switch to indicate the port of the first switch is an egress port for the node. The providing of the forwarding table may be based on a determination that the port of the first switch is in a link aggregation group. Conversely, in response to a determination that the port is not associated with the link aggregation group may result in a forwarding table indicating the port of the second switch is the egress port may be provided.

In various examples, the determination may be made in response to receipt of data at a particular port, prior to forwarding the data to another switch. In other examples, the determination may be made in response to a learning event, including a flooding event. In yet other examples, the determination may be made in response to a timing event, such as the elapse of a timer. Other events may also be used to instigate the update and or maintenance of forwarding tables.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:
1. A method, comprising:
receiving, via a first switch of a switch module, data intended for a destination, wherein a forwarding table of the first switch indicates a port of a second switch as an egress port for the destination;

determining, via a switch manager of the switch module, that a port of the first switch is a member of a link aggregation group that includes the port of the second switch; and updating, via the switch manager of the switch module, the forwarding table of the first switch to remove indication of the port of the second switch as the egress port and instead indicate the port of the first switch as the egress port for the destination such that the updated forwarding table of the first switch is different than a forwarding table of the second switch with respect to the egress port for the destination to reduce latency of the switch module, wherein the forwarding table of the second switch indicates the port of the second switch as the egress port and does not indicate the port of the first switch as the egress port.

2. The method of claim 1, further comprising:
forwarding, by the first switch of the switch module, the data to the destination via the port of the first switch, wherein the switch manager updates the forwarding table of the first switch to reduce the latency by negating a need to forward the data from the first switch to the second switch.

3. The method of claim 1, further comprising:
receiving, via the first switch of the switch module, additional data intended for the destination; and
forwarding, via the first switch of the switch module, the additional data to the destination via the port of the first switch, wherein the updated forwarding table of the first switch and the forwarding table of the second switch comprise disparate egress ports to reduce the latency of the switch module.

4. The method of claim 1, further comprising:
receiving, via the second switch of the switch module, additional data intended for the destination; and
forwarding, via the second switch of the switch module, the additional data to the destination via the port on the second switch, wherein the switch module comprises the second switch.

5. The method of claim 1, further comprising:
receiving, by the switch module, input assigning the port on the second switch and the port on the first switch to the link aggregation group, and wherein the switch manager updating the forwarding table of the first switch is in response to the switch manager determining that the port of the first switch is a member of the link aggregation group.

6. A switch module device, comprising: a first switch comprising a port associated with a link aggregation group;
a second switch coupled to the first switch via a link, wherein the second switch includes a port associated with the link aggregation group; and
a switch manager device coupled to the first switch and the second switch, wherein the switch manager device is to provide a first forwarding table to the first switch that identifies the port of the first switch as an egress port for a destination and a second forwarding table to the second switch that identifies the port of the second switch as the egress port for the destination in response to the switch manager device determining that the port of the first switch and the port of the second switch are both in the link aggregation group, wherein the first forwarding table is different than the second forwarding table with respect to the egress port to reduce latency of the switch module device, and wherein the first forwarding table does not identify the port of the second switch as the egress port, and the second forwarding table does not identify the port of the first switch as the egress port.

7. The switch module device of claim 6, further comprising:
a third switch coupled to the first switch and the second switch via additional links.

8. The switch module device of claim 6, wherein the first switch is a switch application specific integrated circuit (ASIC).

9. The switch module device of claim 6, wherein the first switch further comprises a second port unassociated with the link aggregation group.

10. The switch module device of claim 6, wherein the first switch is to forward data to the destination via the port of the first switch in response to receipt of the first forwarding table, and wherein the first forwarding table is to be provided by the switch manager device to the first switch to reduce the latency of the switch module device by negating a need to forward the data from the first switch to the second switch.

11. The switch module device of claim 6, wherein the switch manager is to receive input that assigns the port of the first switch and the port of the second switch to the link aggregation group, and wherein the switch manager device to maintain the first forwarding table as different than the second forwarding table to reduce the latency.

12. The switch module device of claim 6, wherein the first switch and the second switch are stacked, and wherein the switch manager device to reduce the latency by maintaining the first forwarding table as having a different forwarding table entry than the second forwarding table.

13. A non-transitory computer readable medium including a plurality of programming instructions stored thereon which, if executed by a processor to perform as a switch manager of a switch module to perform steps comprising:
determining whether a port of a first switch in the switch module is in a link aggregation group that includes a port of a second switch in the switch module, wherein data is received on the port of the second switch from a node; and
providing a forwarding table to the first switch to indicate the port of the first switch is an egress port for the node in response to a determination by the switch manager that the port of the first switch is in the link aggregation group, wherein the forwarding table provided to the first switch is different than a forwarding table of the second switch with respect to the egress port for the node to reduce latency of the switch module, wherein the forwarding table of the first switch does not indicate the port of the second switch as the egress port for the node, and wherein the forwarding table of the second switch indicates the port of the second switch as the egress port for the node and does not indicate the port of the first switch as the egress port for the node.

14. The non-transitory computer readable medium of claim 13, wherein the plurality of programming instructions, if executed, further cause the switch module to:
determine whether the port of the first switch is in the link aggregation group that includes the port of the second switch in response to receipt of the data.

15. The non-transitory computer readable medium of claim 13, wherein the plurality of programming instructions, if executed, further cause the switch module to:
determine whether the port of the first switch is in the link aggregation group that includes the port of the second switch in response to a learning event.

16. The non-transitory computer readable medium of claim 13, wherein the plurality of programming instructions, if executed, further cause the switch module to:
   determine whether the port of the first switch is in the link aggregation group that includes the port of the second switch in response to a timing event.

17. The non-transitory computer readable medium of claim 13, wherein the plurality of programming instructions, if executed, further cause the switch module to:
   provide a forwarding table to the second switch to indicate the port of the second switch is the egress port for the node.

18. The non-transitory computer readable medium of claim 13, wherein the plurality of programming instructions, if executed, further cause the switch module to:
   provide a forwarding table to a third switch, the third switch coupled to the first switch and to the second switch.

* * * * *